(12) United States Patent
Dinant et al.

(10) Patent No.: US 11,712,947 B2
(45) Date of Patent: Aug. 1, 2023

(54) AIR VENT

(71) Applicant: Faurecia Innenraum Systeme GmbH, Hagenbach (DE)

(72) Inventors: Bruno Dinant, Saint-Brice-sous-Forêt (FR); Erwan Sagot-Dutertre, Méru (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 177 days.

(21) Appl. No.: 17/248,764

(22) Filed: Feb. 5, 2021

(65) Prior Publication Data
US 2021/0245580 A1 Aug. 12, 2021

(30) Foreign Application Priority Data
Feb. 6, 2020 (DE) ...................... 10 2020 201 478.7

(51) Int. Cl.
*B60H 1/34* (2006.01)

(52) U.S. Cl.
CPC ..... *B60H 1/345* (2013.01); *B60H 2001/3471* (2013.01)

(58) Field of Classification Search
CPC ............ B60H 1/345; B60H 2001/3471; B60H 1/3414; B60H 1/24; F24F 13/06
USPC ........................................ 454/152, 153, 155
See application file for complete search history.

(56) References Cited

U.S. PATENT DOCUMENTS

2019/0168583 A1* 6/2019 Dinant ................. B60H 1/3428

FOREIGN PATENT DOCUMENTS

| CN | 112297777 A | * | 2/2021 | ......... B60H 1/00564 |
|---|---|---|---|---|
| DE | 102004037703 A1 | * | 2/2006 | ......... B60H 1/00564 |
| DE | 102012023847 A1 | * | 7/2013 | ............. B60H 1/345 |
| DE | 102013210053 B3 | * | 9/2014 | ........... B60H 1/3414 |
| EP | 1243450 A2 | * | 9/2002 | ........... B60H 1/3414 |
| EP | 2039544 A1 | * | 3/2009 | ........... B60H 1/3414 |
| EP | 3693198 A1 | * | 8/2020 | ........... B60H 1/3414 |

* cited by examiner

*Primary Examiner* — Jessica Yuen
(74) *Attorney, Agent, or Firm* — Schwegman Lundberg & Woessner, P.A.

(57) ABSTRACT

The disclosure concerns an air vent for a vehicle, comprising a housing, configured to guide an air flow from an air inlet opening to an air outlet opening substantially along an axial direction, an air guiding element arranged at least partly within the housing such that a first air guiding surface of the air guiding element and the housing define a first air channel for guiding a first partial air flow, a second air guiding surface of the air guiding element and the housing define a second air channel for guiding a second partial air flow. The air guiding element also comprises a manipulator which is configured to pivot the first air guiding surface and the second air guiding surface independently of each other for regulating a ratio between the first partial air flow and the second partial airflow.

20 Claims, 6 Drawing Sheets

AIR VENT

CLAIM FOR PRIORITY

This application claims the benefit of priority of German Application No. 10 2020 201 478.7, filed Feb. 6, 2020, which is hereby incorporated by reference in its entirety.

TECHNICAL FIELD

The disclosure concerns an air vent, particularly an air vent for a vehicle. An air vent of the type described herein comprises a housing configured to guide an air flow from an air inlet opening to an air outlet opening as well as various components configured to guide and/or shut off the air flow and regulate, for instance, the flow rate and/or directionality of the air flow.

BACKGROUND

Numerous examples of such air vents are known in the art. In many cases, spatial constraints need to be taken into account when considering the placement of air vents. In particular, the available space for air vents in dashboards, center consoles, ceilings, pillars, door modules, or similar interior elements of a motor vehicle may be highly limited. Accommodating the various components of the air vent for guiding, shutting and regulating the air flow may make the air vent too large to easily fit into the available space.

SUMMARY/OVERVIEW

Consequently, a problem to be solved by the present disclosure is to provide an air vent that avoids the above-mentioned shortcomings.

This problem is solved by an air vent according to independent claim 1. Preferred embodiments, further developments, and applications become apparent in combination with the dependent claims.

An air vent of the kind proposed here comprises a housing, configured to guide an air flow from an air inlet opening to an air outlet opening substantially along an axial direction, an air guiding element arranged at least partly within the housing such that a first air guiding surface of the air guiding element and the housing define a first air channel for guiding a first partial air flow, a second air guiding surface of the air guiding element and the housing define a second air channel for guiding a second partial air flow.

An interior of the housing defines a cavity. The air outlet opening is configured to fluidly connect the cavity with surrounding air. The air inlet opening and the air outlet opening may be diametrical or nearly diametrical with respect to one another. A central axis is defined as an axis extending approximately through the center of the housing from the air inlet opening to the air outlet opening. For example, if the air vent has a mirror symmetric arrangement, the central axis may be an axis in the symmetry plane. The central axis may be a curved line part. The axial direction is defined as a direction parallel to or coaxial with the central axis.

The air inlet opening may be connectable or connected to an air duct. The air duct may be part of an HVAC (heating and/or ventilation and/or air conditioning) system. The HVAC system may be an HVAC system of a motor vehicle. The air duct may be configured to cause the air flow through the cavity, e.g. by being fluidly connected to a central unit of the HVAC system.

The air outlet opening may be configured to allow for the cavity to be fluidly connected with, for instance, a space in the interior of a motor vehicle or any other space where a discharge of air is desired. The air outlet opening may be configured to allow for a discharge of the air flow into said space when the air inlet opening is connected to the air duct of the HVAC system.

The air guiding element may be a substantially rigid body mounted in a fixed position with respect to the housing. The air guiding element is fully or partially contained within the cavity. Spaces between the housing and the air guiding element on opposite sides of the air guiding element form part of the first air channel and the second air channel. In particular, the first air guiding surface and the second air guiding surface may be arranged on opposite sides of the air guiding element.

The first air guiding surface is pivotable around a first pivot axis for regulating the first partial airflow, the second air guiding surface is pivotable around a second pivot axis for regulating the second partial air flow, the second pivot axis being parallel to or co-axial with the first pivot axis.

The first air guiding surface and the second air guiding surface being pivotable means that the first air guiding surface is an outer surface of a first pivotable element (pivotable around the first pivot axis), the second air guiding surface is an outer surface of a second pivotable element (pivotable around the second pivot axis), each of the first pivotable element and the second pivotable element being configured to be pivotable to a closed position, in which the respective air channel is closed and the corresponding partial air flow is shut off or minimal, and an open position, in which the respective air channel is open and the corresponding partial air flow is maximal. When the first and/or second pivotable element is in the closed/open/intermediate position, the respective air guiding surface is also referred to as being in the closed/open/intermediate position.

In the respective closed position, the first air guiding surface and the second air guiding surface may be pivoted away from a central body of the air guiding element into the first air channel and the second air channel, respectively. The first air guiding surface and the second air guiding surface may be configured to be pivotable to intermediate positions between the open position and the closed position to regulate the corresponding partial air flows to corresponding intermediate values.

The air guiding element comprises a manipulator, which manipulator is configured to pivot the first air guiding surface and the second air guiding surface independently of each other for regulating a ratio between the first partial air flow and the second partial airflow. Independently here means that a pivoting direction of an air guiding surface is not related to a predefined pivoting direction of the other air guiding surface. This means that the manipulator is configured for pivoting only one of the air guiding surfaces while the other air guiding surface is static relative to the housing.

Independent pivoting does not exclude a synchronisation and/or coupling of the movement of both air guiding surfaces. For example, the first air guiding surface may be static with respect to the housing while the second air guiding surface is pivoted within a first pivoting range and/or the manipulator is moved within a first manipulator motion range, whereas a pivoting motion of the first air guiding surface may be coupled to a pivoting motion of the second air guiding surface within a second pivoting range and/or coupled to a motion of the manipulator within a second manipulator motion range.

Such a manipulator in combination with the first air guiding surface and the second air guiding surface being pivotable as described enables, on the one hand, regulating the first partial air flow and/or the second partial air flow and on the other hand providing a central air guiding element. This allows for a space-saving placement of the regulating elements (i.e. the first and second air guiding surface and the manipulator) and a correspondingly compact housing, particularly along the axial direction, as no additional regulating elements need to be arranged in other parts of the air vent. The available space in the first air channel and the second air channel at or near the air guiding element is used in an efficient, space-saving manner for accommodating the first air regulating element and the second air regulating element.

Furthermore, using air guiding surfaces of the air guiding element as air regulating elements may reduce the number of required parts and/or improve the air guiding properties of the first air channel and the second air channel.

In an embodiment, the manipulator is arranged at a first end portion of the air guiding element, the first end portion oriented towards the air outlet opening or projecting through the air outlet opening. This embodiment enables convenient operation of the first air guiding surface and/or the second air guiding surface (i.e. full or partial opening and/or closing of the first air channel and/or the second air channel). The manipulator may be operated manually—for example, using an operating element such as a knob or lever—or via an actuator, for example a motor.

The manipulator may comprise a first actuating element movably arranged in between the first air guiding surface and the second air guiding surface for pivoting the first air guiding surface and a second actuating element movably arranged in between the first air guiding surface and the second air guiding surface for pivoting the second air guiding surface. The first actuating element and the second actuating element may be pivotably and/or slidably arranged at the air guiding element. The first actuating element and the second actuating element may be arranged at or near the first end portion of the air guiding element, more in particular at or near an end portion of the air guiding surfaces removed from the pivoting axes of the air guiding surfaces. The first actuating element and the second actuating element may also be arranged at a different portion of the air guiding element, for example closer to the pivoting axes. The placement of the first actuating element and the second actuating element may be chosen differently, for instance, according to the placement of the first and second pivot axis.

The first actuating element may be pivotable around a third pivot axis and the second actuating element may be pivotable around a fourth pivot axis, the fourth pivot axis being parallel to or co-axial with the third pivot axis.

Arranging the first pivot axis and the second pivot axis in this way allows for favorable constructive arrangements of the first actuating element and the second actuating element such that they may be actuated or manipulated by robust and user-friendly control elements.

The third pivot axis and the fourth pivot axis may be parallel to the first pivot axis and the second pivot axis.

Arranging the third pivot axis and the fourth pivot axis in this way allows for favorable constructive arrangements of the first air guiding surface with respect to the first actuating element and the second air guiding element with respect to the second actuating element. For instance, the first and second actuating element may be arranged within an interior of the air guiding element when first and second air guiding surface are in the open position, respectively. In this con-figuration, the first pivotable element and the second pivotable element with the respective air guiding surfaces may cover the portion of the interior of the air guiding element where the respective actuating elements are arranged. Moving the first and/or second actuating element out of their positions in the interior of the air guiding element towards the housing may then lead to the first and/or second air guiding surface, respectively, being pushed away from the center of the air guiding element (by pushing on the respective pivotable element) and into the first and/or second air channel, respectively (i.e. towards the closed position or an intermediate position).

When the first and/or second air guiding surface is in a position in which the first and/or second air channel is not closed, moving the respective actuating element back into its position within the interior of the air guiding element will allow the respective air guiding surface to return to its open position in which the respective channel is maximally opened. The first and second actuating element may be connected to the first and second pivotable element, respectively, for example via a pivotable and/or slidable coupling. A portion of each of the actuating elements may, for instance during a pivoting motion, slide through a groove on an interior side of the respective pivotable element or slide on a rail-like feature on an interior side of the respective pivotable element. The air guiding element may also comprise at least one biasing member configured to bias the first and/or second air guiding surface towards the open position and/or towards the closed position. Similarly, the manipulator may comprise at least one biasing member configured to bias the first and/or second actuating element and/or the operating element to a position corresponding to the closed position and/or the open position.

The first actuating element and the second actuating element may be or comprise pivotable flaps.

Using pivotable flaps, which flaps may have a length in the direction of the pivot axis that is smaller than or equal to the length of the corresponding air guiding surface in the direction of its pivot axis, as actuating elements may have the advantage that they allow for a robust construction, even distribution of forces acting on the first and second pivotable element, and that numerous ways to manipulate such flaps are known in the art. Alternatively, different actuating elements may be used, such as pivotable and/or slidable and/or retractable rods and/or bars.

The air guiding element may enclose a cavity in all pivoting positions of the first and second air guiding surface. In this way, dust or other small particles can be prevented from entering the interior of the air guiding element, independent of the position of the first and second air guiding surface. The visual appearance of the air vent may also be improved by not visibly exposing the interior of the air guiding element.

The first air channel and the second air channel may be configured such that the first partial air flow and the second partial air flow collide, in particular such that said partial air flows collide at the downstream side of the air guiding element, i.e. near the air outlet opening. Regulating the first and/or second partial air flow—in particular by pivoting the first air guiding surface and/or the second air guiding surface as described—may then regulate a net discharge direction of the air flow discharged through the air outlet opening.

The air guiding element may have a substantially egg-shaped or teardrop-shaped cross-section when looking in a direction along the first or second pivot axis. Such a shape may have favorable air guiding/air flow properties, for example for obtaining a coanda effect.

The housing may have a first length along the axial direction, the air guiding element may have a second length along the axial direction, and the second length may be at least half or at least two thirds of the first length. In this way, good air guiding properties of the air guiding element as well as a compact design of the housing, especially along the axial direction, may be achieved. However, other length ratios are possible; for instance, the second length may be less than half of the first length or more than the first length, permitting a desired balance of air guiding properties and compactness or to take into account other design parameters of the air vent.

The first air guiding surface may have a third length along the axial direction and the second air guiding surface may have a fourth length along the axial direction, the third and fourth length being at least half or at least two thirds of a length of the air guiding element along the axial direction. In this way, particularly good air guiding properties of the air guiding element as well as a particularly compact design of the housing, especially along the axial direction, may be achieved. However, other length ratios are possible; for instance, the third and fourth length may be less than half of the length of the air guiding element along the axial direction, permitting a desired balance of air guiding properties and compactness or to take into account other design parameters of the air vent.

The air vent may further comprise at least one directional vane arranged at least partly within the housing, the at least one directional vane being pivotable around an axis that may be perpendicular to the first pivot axis and configured to regulate a direction of the air flow. Preferably, the air vent may comprise a plurality of directional vanes, in particular a plurality of directional vanes arranged in a pairwise parallel orientation. For instance, the at least one directional vane may be arranged at least partially between the air guiding element and the air inlet opening. The at least one directional vane may at least partially overlap the air guiding element along the axial direction.

If the air vent comprises at least one directional vane, an operating element (such as a knob or lever) of the manipulator may further be configured to be movable for pivoting the at least one directional vane, thereby providing a convenient way to operate multiple movable elements using the same manipulating element. For example the knob may be slidable for pivoting the at least one directional vane.

BRIEF DESCRIPTION OF THE FIGURES

The above, as well as other advantages of the proposed air vent, will become apparent to those skilled in the art from the following detailed description of certain embodiments of the air vent when considered in the light of the accompanying drawings, in which.

DETAILED DESCRIPTION

Figure 1:
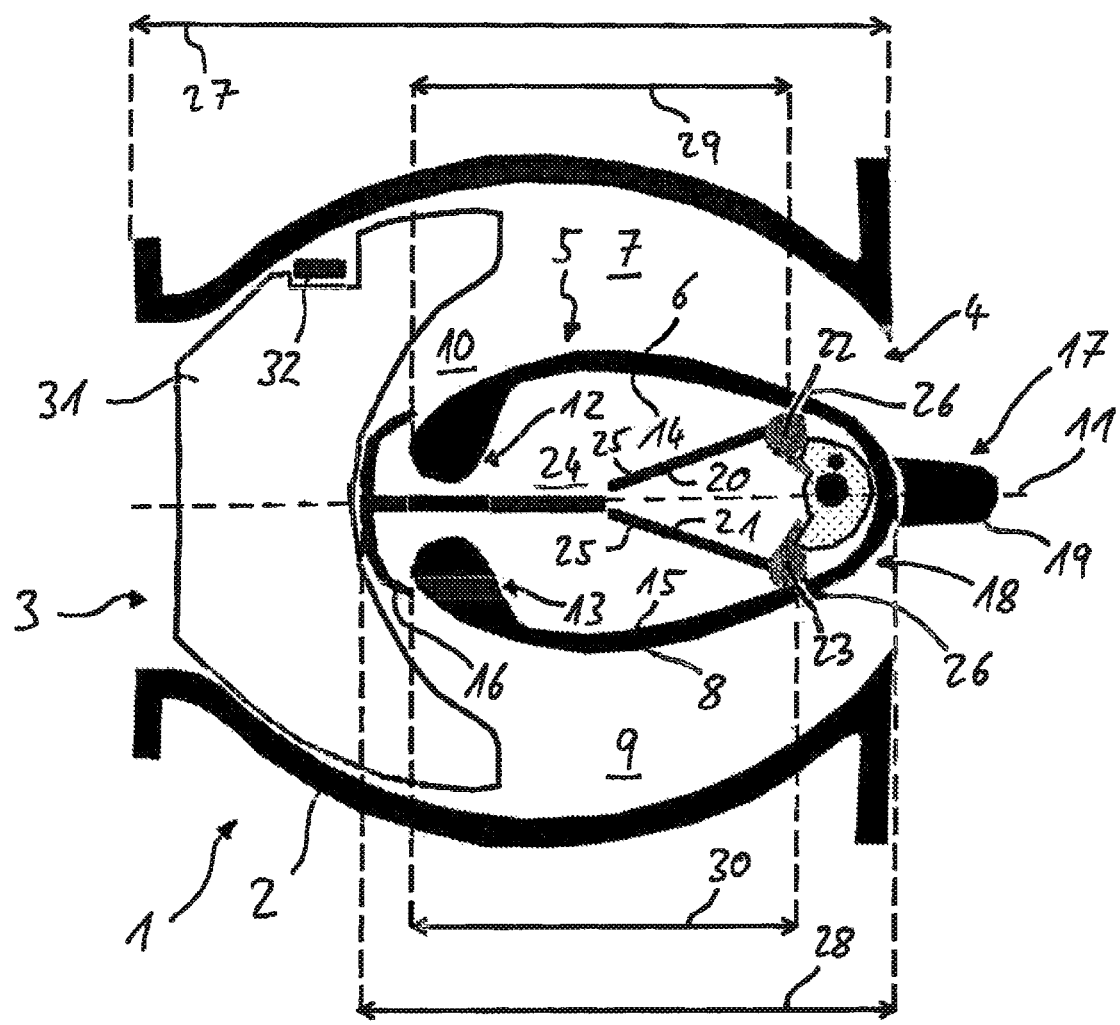
FIG. 1 shows, schematically, a cross-section of an air vent with a first air guiding surface in an open position and a second air guiding surface in an open position.

Recurring features in FIG. 1-FIG. 6 are provided with identical reference numerals and partially omitted where these features are not referred to, in the following, with reference to a given drawing.

The air vent 1 shown in FIG. 1 comprises a housing 2, configured to guide an air flow from an air inlet opening 3 to an air outlet opening 4 substantially along an axial direction, an air guiding element 5 arranged within the housing 2 such that a first air guiding surface 6 of the air guiding element 5 and the housing 2 define a first air channel 7 for guiding a first partial air flow, a second air guiding surface 8 of the air guiding element 5 and the housing 2 define a second air channel 9 for guiding a second partial air flow.

An interior of the housing 2 defines a cavity 10. The air outlet opening 4 is configured to fluidly connect the cavity 10 with surrounding air. The air inlet opening 3 and the air outlet opening 4 are diametrical with respect to one another. The air vent 1 has a mirror symmetric arrangement about a symmetry plane containing a central axis 11, the central axis 11 extending through the center of the housing 2 from the air inlet opening 3 to the air outlet opening 4 The axial direction is defined as a direction parallel to or coaxial with the central axis 11.

The air inlet opening 4 is connectable to an air duct (not shown), which is part of an HVAC (heating and/or ventilation and/or air conditioning) system of a motor vehicle, the air vent 1 being mountable in a trim panel 12 of the motor vehicle. Through the air outlet opening 4 the cavity 10 is in fluid connection with a space in the interior of a motor vehicle such that the air outlet opening 4 allows fora discharge of the air flow into said space.

The air guiding element 5 is a substantially rigid body comprising, for instance, plastic or metal materials. The air guiding element 5 is affixed to walls of the housing 2, i.e. mounted in a fixed position with respect to the housing 2, and contained mostly within the cavity 10 such that spaces between the housing 2 and the air guiding element 5 on opposite sides of the air guiding element 5 form part of the first air channel 7 and the second air channel 9. In particular, the first air guiding surface 6 and the second air guiding surface 8 are arranged on opposite sides of the air guiding element 5.

The first air guiding surface 6 is pivotable around a first pivot axis 12 for regulating the first partial air flow, the second air guiding surface 8 is pivotable around a second pivot axis 13 for regulating the second partial air flow, the second pivot axis 13 being parallel to the first pivot axis 12. More particularly, the first air guiding surface 6 is an outer surface of a first pivotable element 14, the second air guiding surface 8 is an outer surface of a second pivotable element 15, each of the first pivotable element 14 and the second pivotable element 15 being configured to be pivotable to a closed position, in which the respective air channel 7 or 9 is closed and the corresponding partial air flow is shut off or minimal, and an open position, in which the respective air channel 7 or 9 is open and the corresponding partial air flow is maximal. In the respective open position, the first air guiding surface 6 and the second air guiding surface 8 may be pivoted away from a central body 16 of the air guiding element 5 into the first air channel 7/the second air channel 9, respectively. The first air guiding surface 6 and the second air guiding surface 8 is further configured to be pivotable to intermediate positions between the open position and the closed position to regulate the corresponding partial air flows to corresponding intermediate values.

In this embodiment, the first pivot axis 12 is arranged at an end part of the first air guiding surface 6 facing the air inlet opening 3 and the second pivot axis 13 is arranged at an end part of the second air guiding surface 8 facing the air inlet opening 3. So, both pivot axes 12, 13 are arranged at the stream upward side of the air guiding surfaces 6, 8. The position of both axes 12, 13 is fixed relative to the housing 2. In other embodiments, the pivot axes may be arranged more in the direction of the air outlet opening.

The air guiding element 5 comprises a manipulator 17 arranged at a first end portion 18 of the air guiding element 5, the first end portion 18 oriented towards the air outlet opening 4 or projecting through the air outlet opening 4, wherein the manipulator 17 is configured to pivot the first air guiding surface 6 and the second air guiding surface 8 for regulating a ratio between the first partial air flow and the second partial airflow. Arranged at the first end portion means that the manipulator 17 is arranged closer to this end portion than to a second end portion of the air guiding element 5 that is directed towards the air inlet opening 3. The manipulator 17 comprises a knob 19 such that it is operable manually. The manipulator 17 may also be operable using an actuator such as a motor. In such an embodiment, the knob 19 may be omitted.

The manipulator 17 comprises a first actuating element 20 pivotably arranged near the first end portion 18 of the air guiding element 5 for pivoting the first air guiding surface 6 and a second actuating element 21 pivotably arranged near the first end portion 18 of the air guiding element 5 for pivoting the second air guiding surface 8. The first actuating element 20 and the second actuating element 21 are pivotable flaps made of a substantially rigid material, such as plastic or metal. Alternatively, different actuating elements may be used, such as pivotable and/or slidable and/or retractable rods and/or bars.

Figure 5:
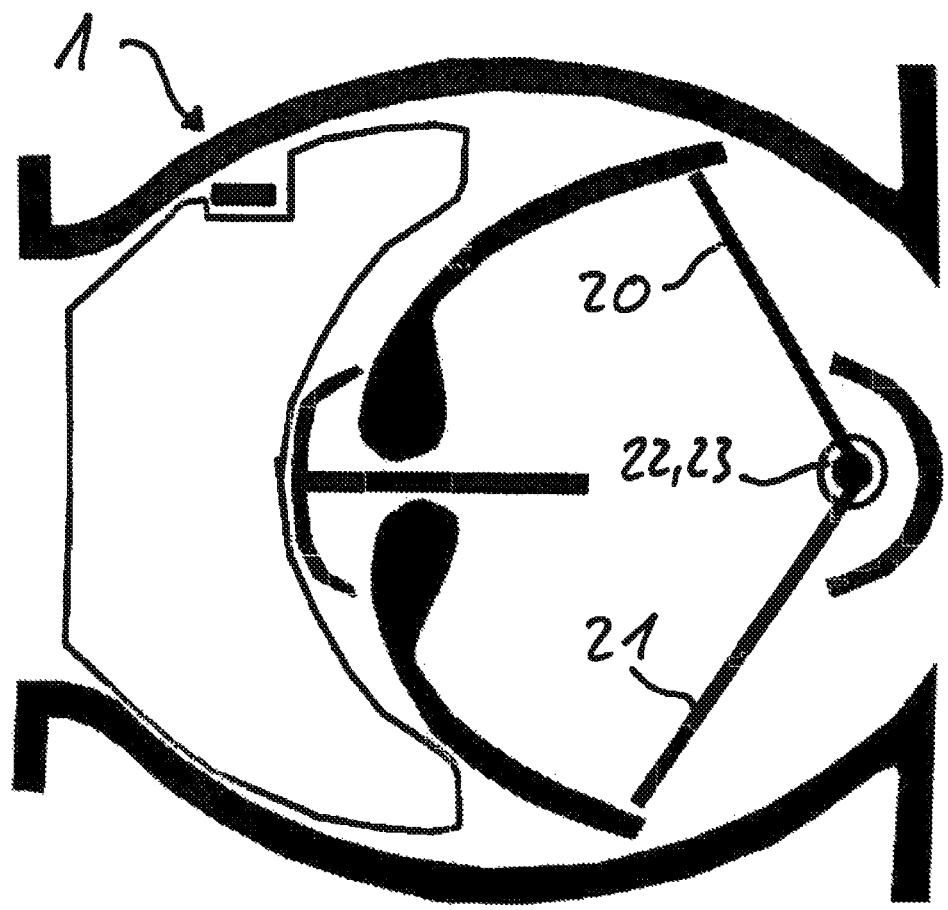
FIG. 5 shows, schematically, a cross-section of another embodiment of the air vent with both air guiding surfaces in the closed position.
Figure 6:
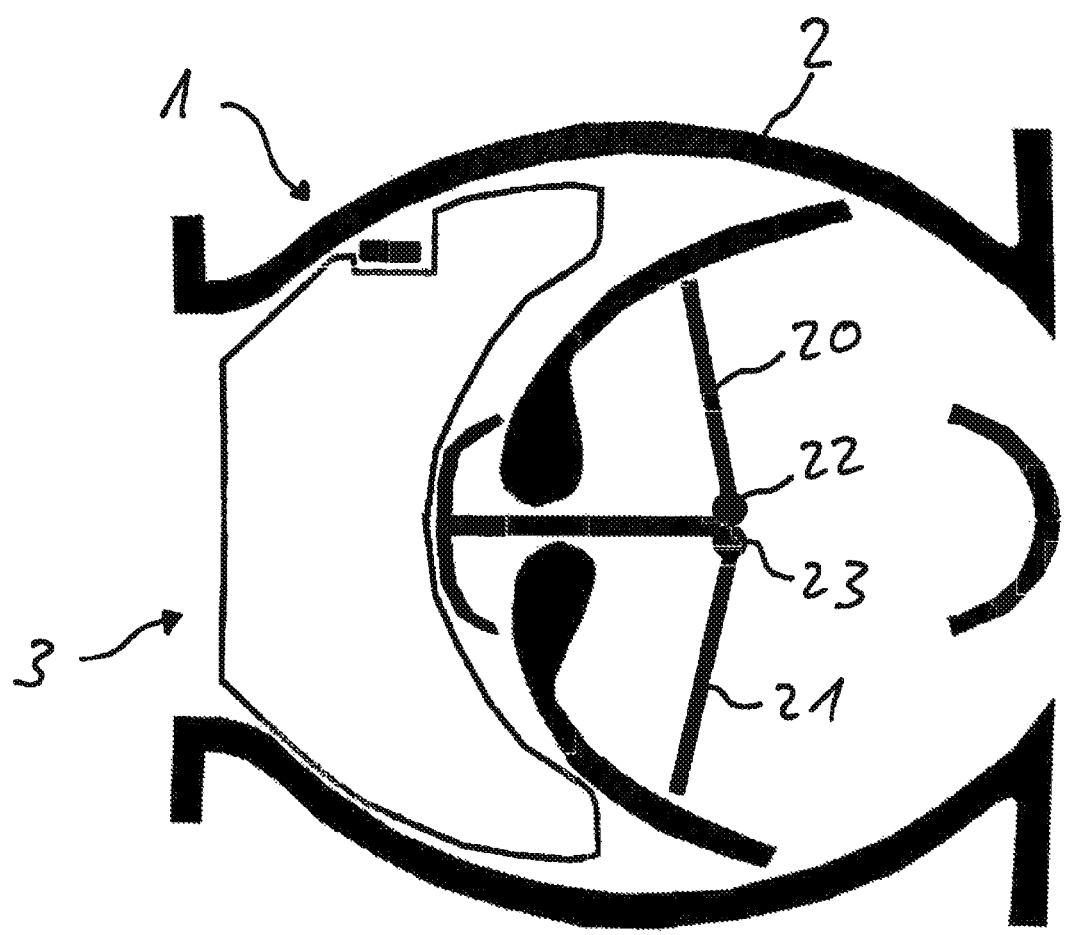
FIG. 6 shows, schematically, a cross-section of still another embodiment of the air vent with both air guiding surfaces in the closed position.

The first actuating element 20 is pivotably arranged in the air guiding element 5 such that the first actuating element 20 is pivotable around a third pivot axis 22. The second actuating element 21 is also pivotably arranged in the air guiding element 5 such that the second actuating element 21 is pivotable around a fourth pivot axis 23. The fourth pivot axis 23 is parallel to the third pivot axis 22, the first pivot axis 12, and the second pivot axis 13. The third and fourth pivot axis 22, 23 may be co-axial axes as shown in FIG. 5. The third and fourth pivot axis 22, 23 are arranged at the first end portion of the air guiding element 5. In another embodiment these pivot axes 22, 23 may be arranged more close to the air inlet opening 3 of the housing 2 as shown in FIG. 6. The embodiments shown in FIG. 5 and FIG. 6 do not comprise a knob for manual operation and illustrate a motorized operation. In other embodiments such a knob for manual operation may be present.

As shown in FIG. 1, the first and second actuating element 20 and 21 are arranged within an interior 24 of the air guiding element 5 when first and second air guiding surface 6 and 8 are in the open position, respectively. In this configuration, the first pivotable element 14 and the second pivotable element 15 with the respective air guiding surfaces 6 and 8 cover the portion of the interior 24 of the air guiding element 5 where the respective actuating elements are arranged. Moving the first and/or second actuating element 20 or 21 out of their positions in the interior 24 of the air guiding element 5 towards the housing 2 leads to the first and/or second air guiding surface 6 or 8, respectively, being pushed away from the center of the air guiding element 5 (by pushing on the respective pivotable element 14 or 15) and into the first air channel 7 (as shown in FIG. 2) and/or into second air channel 9 (as shown in FIG. 3), respectively (i.e. towards the closed position or an intermediate position).

Figure 2:
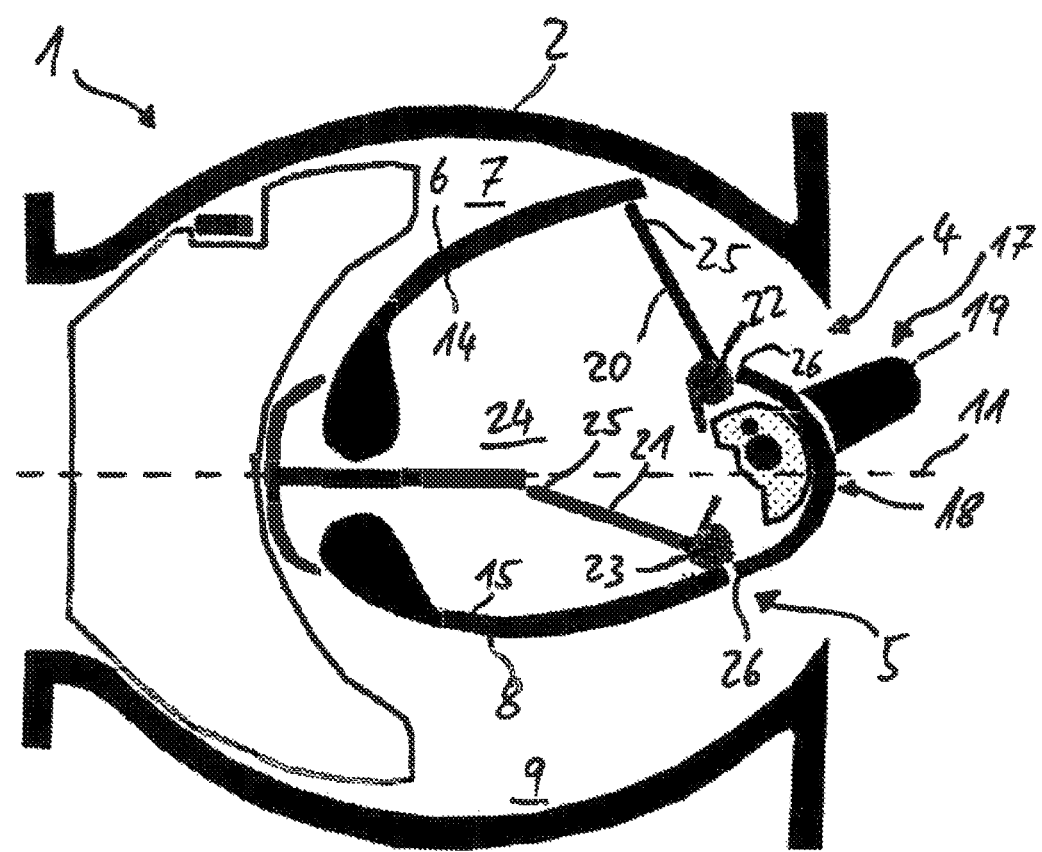
FIG. 2 shows, schematically, a cross-section of the air vent of FIG. 1 with the first air guiding surface in a closed position and the second air guiding surface in the open position.
Figure 3:
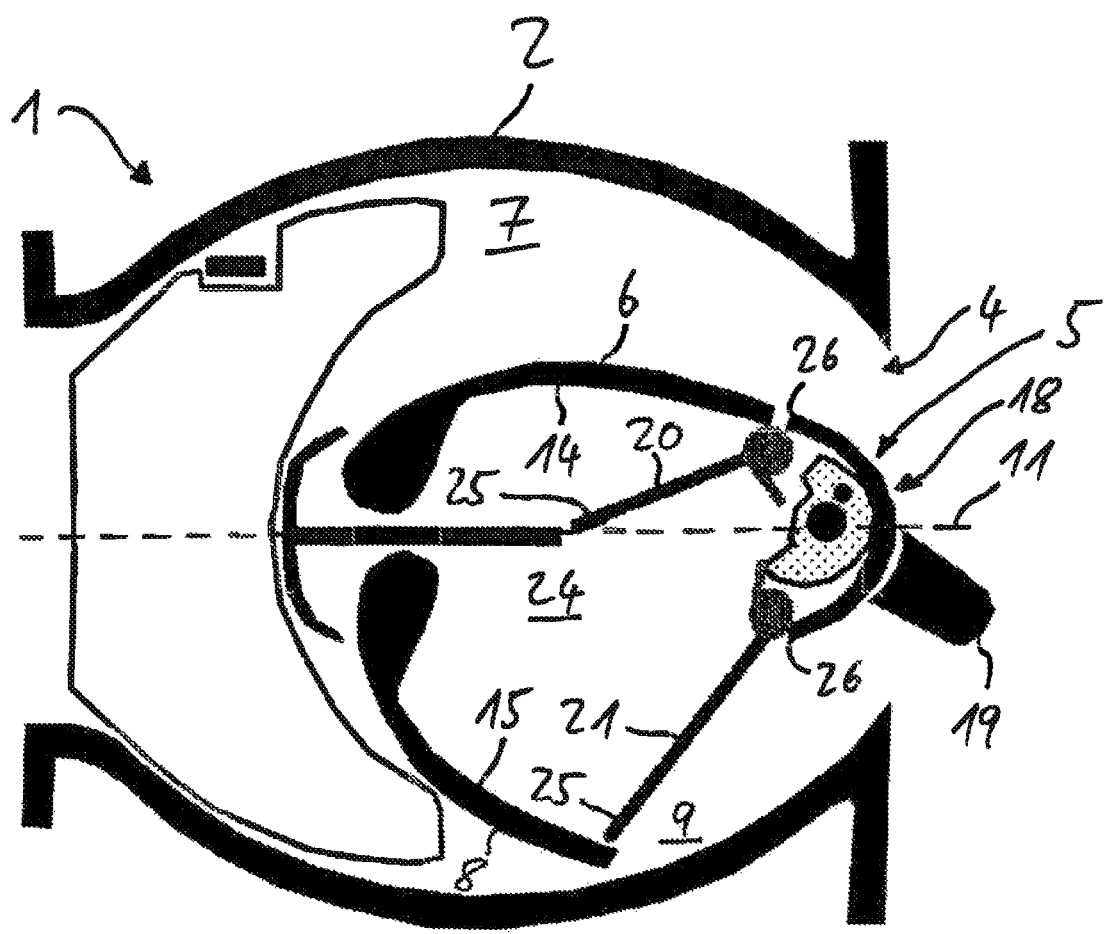
FIG. 3 shows, schematically, a cross-section of the air vent of FIG. 1 with the first air guiding surface in the open position and the second air guiding surface in the closed position.

As shown in FIG. 2 and FIG. 3, moving the first/second actuating element 20/21 towards the housing 2 is achieved by pivoting the knob 19 towards the first/second air channel 7/9, respectively. During this pivoting motion of the knob 19, the first/second actuating element 20/21 pivots around the third/fourth pivot axis 22/23, while an end portion 25 of the actuating element 20/21 pivots towards the first end portion 18 of the air guiding element 5 and then slides towards an edge portion 26 of the air guiding element 5 until the first/second air guiding surface 6/8 is in the closed position. The end portion 25 of the actuating element 20/21 is arranged at the end of the actuating element 20/21 opposite the position of the third/fourth pivot axis 22/23.

When the first/second air guiding surface 6/8 is in the closed position or an intermediate position between the closed position and the open position, moving the respective actuating element 20/21 back into its position within the interior 24 of the air guiding element 5 (by pivoting the knob 19 towards the central axis 11) allows the respective air guiding surface 6/8 to return to its open position by reversing the motion described above. During the motions described above, the first air guiding surface 6 and the second air guiding surface 8 are movable independently. In particular, the manipulator 17 is configured for pivoting only one of the air guiding surfaces 6, 8 while the other air guiding surface is static relative to the housing 2.

Figure 4:
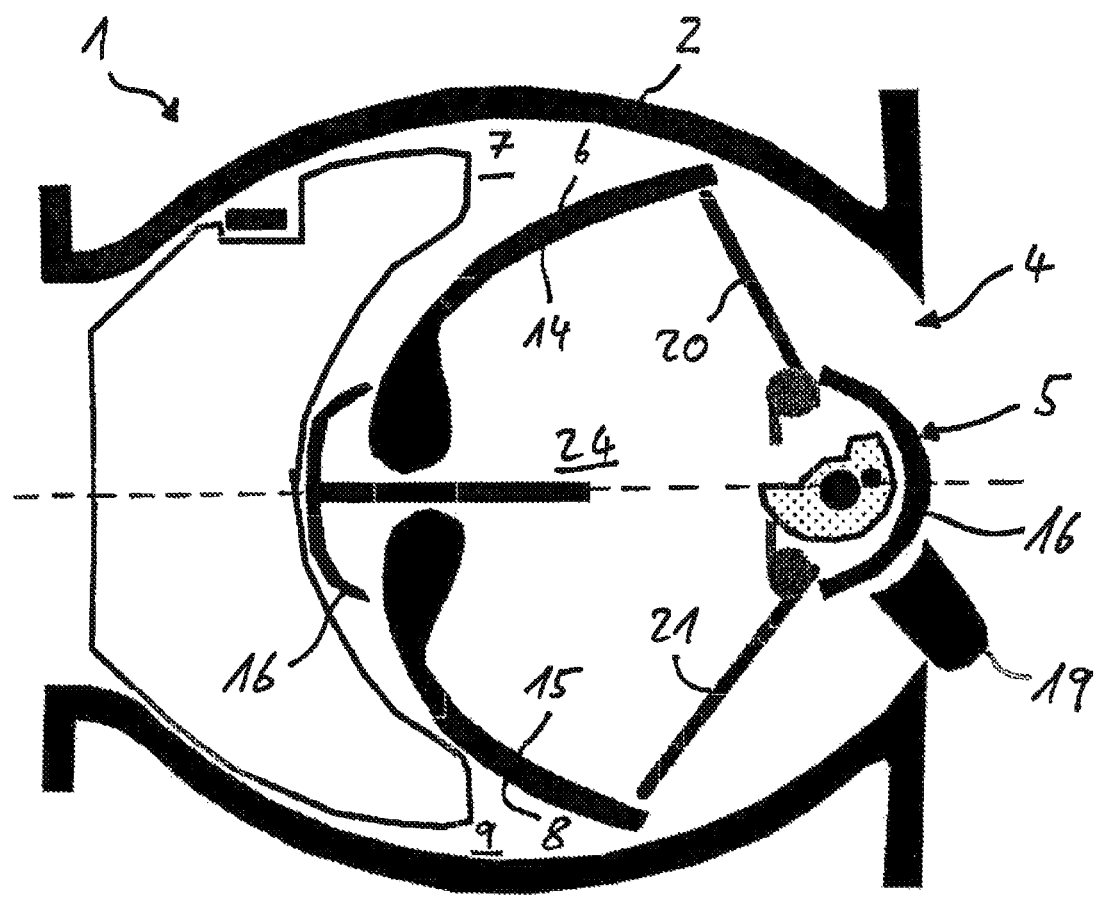
FIG. 4 shows, schematically, a cross-section of the air vent of FIG. 1 with the first air guiding surface in the closed position and the second air guiding surface in the closed position.

As shown in FIG. 3 and FIG. 4, when the second air guiding surface 8 is in the closed position as shown in FIG. 3, pivoting the knob 19 further towards the second air channel 9 pushes also the first air guiding surface 6 into the closed position as shown in FIG. 4, thereby shutting off the air flow through the air vent 1 entirely. Thus, the second air guiding surface 8 is static with respect to the housing 2 while the first air guiding surface 6 is pivoted within a first pivoting range and the manipulator 17 is moved within a first manipulator motion range, whereas a pivoting motion of the second air guiding surface 8 is coupled to a motion of the manipulator 17 within a second manipulator motion range.

As shown in FIG. 1-FIG. 6, the air guiding element 5, in particular the air guiding surfaces 6 and 8, encloses a cavity (formed by the interior 24 of the air guiding element 5) in the open position of both air guiding surfaces. In certain embodiments the cavity may be closed in all pivoting positions of the first and second air guiding surface 6 and 8. This may be the case when the actuating elements 20, 21 are configured as flaps that have the same or almost the same length as the air guiding element 5 in the direction of the first and second pivot axis 12, 13. Sufficiently small gaps at points arranged between the body 16 of the air guiding element 5, the pivotable elements 14 and 15, and the actuating elements 20 and 21 ensure that said cavity is protected from dust and other small particles.

The first air channel 7 and the second air channel 9 are configured—due to their shape and alignment—such that the first partial air flow and the second partial air flow collide at the downstream side of the air guiding element 5, i.e. near the air outlet opening 4. Regulating the first and/or second partial air flow by pivoting the first air guiding surface 6 and/or the second air guiding surface 8 as described (FIG. 1-FIG. 3) regulates a net discharge direction of the air flow discharged through the air outlet opening 4.

Referring again to FIG. 1, the air guiding element 5 has a substantially egg-shaped cross-section when the first air guiding surface 6 and the second air guiding surface 8 are in the open position. Other shapes of the cross-section such as a teardrop-shaped cross-section or an oval cross-section are also possible.

The housing 2 has a first length 27 along the axial direction, the air guiding element 5 has a second length 28 along the axial direction, the first air guiding surface 6 has a third length 29 along the axial direction, and the second air guiding surface 8 has a fourth length 30 along the axial direction.

The second length 28 is about seventy percent of the first length 27, i.e. more than two thirds of the first length 27. However, other length ratios are possible; for instance, the second length 28 may be at least half of the first length 27, less than half of the first length 27, or more than the first length 27.

Each of the third length 29 and the fourth length 30 are about seventy percent of the second length 28, i.e. more than two thirds of the second length 28. However, other length ratios are possible; for instance, the third and fourth length 29 and 30 may be at least half of the second length 28 or less than half of the second length 28.

The air vent further comprises a plurality of directional vanes 31 arranged within the housing 2, partially between the air guiding element 5 and the air inlet opening 3 and partially overlapping the air guiding element 5 along the axial direction (only one directional vane 31 is shown in the drawings). The directional vanes 31 are pivotable around axes perpendicular to the first pivot axis 12 and configured to regulate a direction of the airflow. The directional vanes 31 are arranged in a pairwise parallel orientation, which is maintained by means of a connecting element 32 when the directional vanes 31 are pivoted. The knob 19 of the manipulator 17, in addition to being pivotable in certain directions to move the actuating elements 20 and 21 and thereby the air guiding surfaces 6 and 8, is further configured to be pivotable in different directions for pivoting the plurality of directional vanes 31.

LIST OF REFERENCE NUMERALS

1 Air vent
2 Housing
3 Air inlet opening
4 Air outlet opening
5 Air guiding element
6 First air guiding surface
7 First air channel
8 Second air guiding surface
9 Second air channel
10 Cavity
11 Central axis
12 First pivot axis
13 Second pivot axis
14 First pivotable element
15 Second pivotable element
16 Central body
17 Manipulator
18 First end portion
19 Knob
20 First actuating element
21 Second actuating element
22 Third pivot axis
23 Fourth pivot axis
24 Interior
25 End portion
26 Edge portion
27 First length
28 Second length
29 Third length
30 Fourth length
31 Directional vane
32 Connecting element

The invention claimed is:

1. Air vent for a vehicle, comprising
a housing, configured to guide an air flow from an air inlet opening to an air outlet opening substantially along an axial direction; and
an air guiding element arranged at least partly within the housing such that a first air guiding surface of the air guiding element and the housing define a first air channel for guiding a first partial air flow, a second air guiding surface of the air guiding element and the housing define a second air channel for guiding a second partial air flow, wherein the first air guiding surface is pivotable around a first pivot axis for regulating the first partial air flow, the second air guiding surface is pivotable around a second pivot axis for regulating the second partial air flow, the second pivot axis being parallel to or co-axial with the first pivot axis, and wherein the air guiding element includes a manipulator which is configured to pivot the first air guiding surface and the second air guiding surface independently of each other for regulating a ratio between the first partial air flow and the second partial air flow.

2. The air vent according to claim 1, wherein the manipulator comprises:
a first actuating element movably arranged in between the first air guiding surface and the second air guiding surface for pivoting the first air guiding surface; and
a second actuating element movably arranged in between the first air guiding surface and the second air guiding surface for pivoting the second air guiding surface.

3. The air vent according to claim 2, wherein the first actuating element is pivotable around a third pivot axis and the second actuating element is pivotable around a fourth pivot axis, the fourth pivot axis being parallel to or co-axial with the third pivot axis.

4. The air vent according to claim 3, wherein the third pivot axis and the fourth pivot axis are parallel to the first pivot axis and the second pivot axis.

5. The air vent according to claim 2, wherein the first actuating element and the second actuating element are or include a pivotable flap.

6. The air vent according to claim 1, wherein the first air channel and the second air channel are configured such that the first partial air flow and the second partial air flow collide.

7. The air vent according to claim 1, wherein the air guiding element has a substantially egg-shaped or teardrop-shaped cross-section.

8. The air vent according to claim 1, wherein the housing has a first length along the axial direction, the air guiding element has a second length along the axial direction, and the second length is at least half of the first length.

9. The air vent according to claim 1, wherein the first air guiding surface has a third length along the axial direction and the second air guiding surface has a fourth length along the axial direction, the third and fourth length being at least half of a length of the air guiding element along the axial direction.

10. The air vent according to claim 1, further comprising:
at least one directional vane arranged at least partly within the housing, the at least one directional vane being pivotable around an axis that is perpendicular to the first pivot axis and configured to regulate a direction of the air flow.

11. Air vent for a vehicle, comprising
a housing, configured to guide an air flow from an air inlet opening to an air outlet opening substantially along an axial direction;
an air guiding element arranged at least partly within the housing such that a first air guiding surface of the air guiding element and the housing define a first air channel for guiding a first partial air flow, a second air guiding surface of the air guiding element and the housing define a second air channel for guiding a second partial air flow, wherein the first air guiding surface is pivotable around a first pivot axis for regulating the first partial air flow, the second air guiding surface is pivotable around a second pivot axis for regulating the second partial air flow, the second pivot axis being parallel to or co-axial with the first pivot axis, and wherein the air guiding element includes a manipulator which is configured to pivot the first air guiding surface and the second air guiding surface independently of each other for regulating a ratio between the first partial air flow and the second partial air flow; and
at least one directional vane arranged at least partly within the housing, the at least one directional vane being pivotable around an axis that is perpendicular to the first pivot axis and configured to regulate a direction of the air flow.

12. The air vent according to claim 11, wherein the manipulator comprises:
a first actuating element movably arranged in between the first air guiding surface and the second air guiding surface for pivoting the first air guiding surface; and
a second actuating element movably arranged in between the first air guiding surface and the second air guiding surface for pivoting the second air guiding surface.

13. The air vent according to claim 12, wherein the first actuating element is pivotable around a third pivot axis and the second actuating element is pivotable around a fourth pivot axis, the fourth pivot axis being parallel to or co-axial with the third pivot axis.

14. The air vent according to claim 13, wherein the third pivot axis and the fourth pivot axis are parallel to the first pivot axis and the second pivot axis.

15. The air vent according to claim 12, wherein the first actuating element is a pivotable flap.

16. The air vent according to claim 12, wherein the second actuating element is a pivotable flap.

17. The air vent according to claim 12, wherein the first actuating element includes a pivotable flap.

18. The air vent according to claim 12, wherein the second actuating element includes a pivotable flap.

19. Air vent for a vehicle, comprising
a housing, configured to guide an air flow from an air inlet opening to an air outlet opening substantially along an axial direction;
an air guiding element arranged at least partly within the housing such that a first air guiding surface of the air guiding element and the housing define a first air channel for guiding a first partial air flow, a second air guiding surface of the air guiding element and the housing define a second air channel for guiding a second partial air flow, wherein the first air guiding surface is pivotable around a first pivot axis for regulating the first partial air flow, the second air guiding surface is pivotable around a second pivot axis for regulating the second partial air flow, the second pivot axis being parallel to or co-axial with the first pivot axis, wherein the air guiding element includes a manipulator which is configured to pivot the first air guiding surface and the second air guiding surface independently of each other for regulating a ratio between the first partial air flow and the second partial air flow, wherein the first air channel and the second air channel are configured such that the first partial air flow and the second partial air flow collide, wherein the air guiding element has a substantially egg-shaped or teardrop-shaped cross-section, wherein the housing has a first length along the axial direction, the air guiding element has a second length along the axial direction, and the second length is at least half of the first length, and wherein the manipulator includes:
a first actuating element movably arranged in between the first air guiding surface and the second air guiding surface for pivoting the first air guiding surface, wherein the first actuating element is pivotable around a third pivot axis; and
a second actuating element movably arranged in between the first air guiding surface and the second air guiding surface for pivoting the second air guiding surface, wherein the second actuating element is pivotable around a fourth pivot axis, the fourth pivot axis being parallel to or co-axial with the third pivot axis;
at least one directional vane arranged at least partly within the housing, the at least one directional vane being pivotable around an axis that is perpendicular to the first pivot axis and configured to regulate a direction of the air flow.

20. The air vent according to claim 19, wherein the first air guiding surface has a third length along the axial direction and the second air guiding surface has a fourth length along the axial direction, the third and fourth length being at least half of a length of the air guiding element along the axial direction.

* * * * *